Jan. 7, 1958     W. M. NICHOLS     2,818,841
PISTONS
Filed April 11, 1955
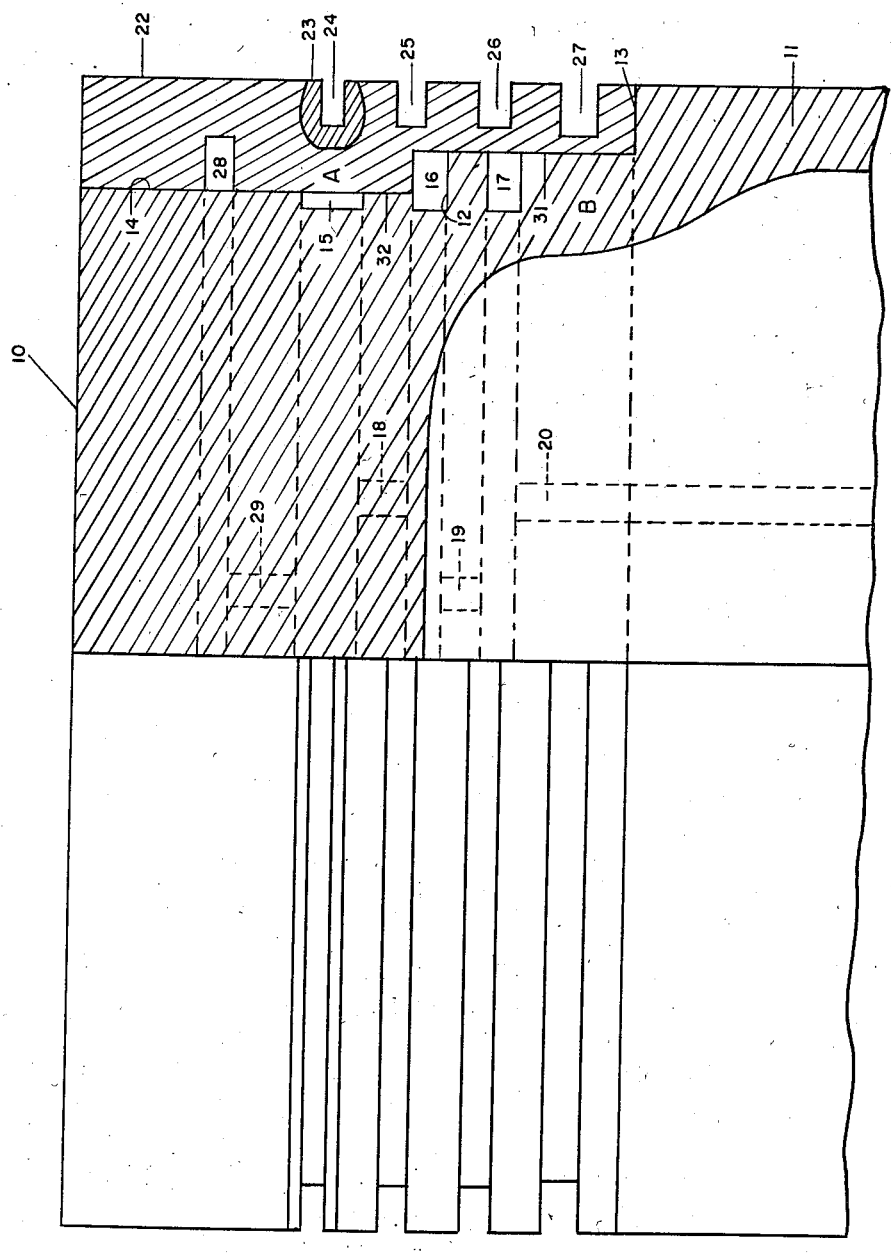
WILLIAM M. NICHOLS
*INVENTOR.*
BY
ATTORNEY

United States Patent Office 2,818,841
Patented Jan. 7, 1958

2,818,841

PISTONS

William M. Nichols, Schenectady, N. Y., assignor to Alco Products, Incorporated, New York, N. Y., a corporation of New York Application April 11, 1955, Serial No. 500,592

3 Claims. (Cl. 123—41.35)

This invention relates to pistons for internal combustion engines and particularly to oil cooled pistons for compression ignition engines of the class commonly referred to as diesel engines.

Aluminum and aluminum base alloys, because of their light weight, have come into general use as the composition material of diesel engine pistons. Aluminum pistons are, however, subject to excessive and rapid wear in the piston ring grooves, particularly in the first or top groove, due to the softness of the metal at the high temperatures developed under working conditions. Some slight wear normally takes place in the grooves and then the inertia of the parts causes a battering action which causes the grooves to wear away rapidly. To prevent such groove wear, resort has been had to a ring of cast iron or of steel alloy inserted in the peripheral wall of the aluminum piston body, such ring insert being grooved for the reception of one or more of the piston rings. The cast iron or steel alloy is sufficiently hard to withstand wear by the piston rings and does not soften at the operating temperatures encountered. An illustration of such an insert is found in Patent #2,124,360 to G. A. Welty.

Another development in diesel engine pistons is the cooling of the piston by the circulation of a medium such as oil through a passageway formed in the body of the piston. In one phase of this development, a cast aluminum or aluminum base alloy piston was used and a coil to conduct the cooling oil was deposited in the piston at the time of its casting. Cast pistons, however, have not proved entirely satisfactory in heavy duty operations. If the pistons are fabricated by forging in order to meet heavy duty requirements, the installation of the oil passageway has been effected by manufacturing the piston with a reduced portion at its top, forming oil conducting grooving in the peripheral wall of the reduced portion, and then shrinking a sleeve on to the reduced portion to close the grooving. Difficulties have resulted from this construction, however, when it has been attempted to install a piston ring carrying insert in the sleeve. Since the piston is hollow, the permissible sleeve thickness is limited; and the result has been cracking of the sleeve in the zone between the insert and the joint between the sleeve and the piston body.

The object of this invention, therefore, has been to provide a novel oil cooled piston of light metal construction which may be equipped with a cast iron or heavy metal piston ring carrying insert, the design of the assembly being such that the piston will not crack under the high temperatures encountered under working conditions.

Another object is to provide such a piston which has a separate removable annular sleeve shrunk on to a reduced portion of the piston body adjacent its top, such removable member serving to carry a piston ring carrying insert and also to close the open side of grooving formed in the periphery of the said reduced portion.

Another object is to provide such a piston in which the reduced portion of the piston body and the above mentioned piston ring carrying sleeve are shaped so that neither the sleeve or piston body will crack under operating conditions.

Other and further objects of the present invention will be apparent from the following description, the accompanying drawing, and the appended claims.

In the drawing there is shown a fragmented longitudinal view of a piston incorporating the invention, half the view being in section and half being in elevation.

The piston illustrated is preferably an aluminum or aluminum base alloy forging and comprises a head 10 and a dependent skirt 11, the latter of which has opposed wrist pin apertures therein (not shown). The upper portion of the head is reduced in diameter in two steps to form shoulders 12 and 13. In the peripheral wall 14 of the reduced portion are a plurality of parallel grooves 15, 16, and 17 extending completely around the piston. These grooves are connected to each other by ducts 18 and 19 and are supplied with cooling fluid by inlet 20 from a source not shown. An outlet (not shown) communicates with the system to lead the cooling fluid back to the source of supply.

An annular sleeve or ring carrier 22 of cast aluminum or of a cast aluminum base alloy is shrunk on to the reduced portion of the piston, thus closing the grooves to form a passageway adapted to conduct an oil coolant through the piston. The peripheral wall of sleeve 22 has a ring insert 23 preferably of a material harder than the material of the sleeve. Cast iron or a forged steel may be used. In order to fix the insert in the sleeve, the latter is preferably cast around the former. Ring 23 has a circumferential groove 24 for the reception of a piston ring. Additional circumferential grooves 25, 26, and 27 may be provided in the piston body below the insert for the reception of additional piston rings. The protection against heat transfer from the hot crown of the piston and sleeve to the lower portion of the sleeve which is afforded by the insert eliminates any requirement for additional inserts for the lower piston rings. There is also formed in the inner wall of the sleeve an annular groove 28 which is connected to groove 15 by duct 29.

It should be pointed out that there is considerable radial thickness in the sleeve in the zone A between the inner surface of the insert 23 and the joint between the sleeve and the piston. Thermal cracking of the sleeve adjacent the inert is thus avoided. It is also pointed out that the inside diameter of portion 31 of the sleeve, which is greater than the inside diameter of portion 32 of the sleeve, provides considerable wall thickness in the piston body in the zone B adjacent the hollow interior of the piston. Strength is thus given to the piston body in a critical zone.

While there has been hereinbefore described an approved embodiment of this invention, it will be understood that many and various changes and modifications in form, arrangement of parts and details of construction thereof may be made without departing from the spirit of the invention, and that all such changes and modifications as fall within the scope of the appended claims are contemplated as a part of this invention.

What I claim is:

1. A piston for an internal combustion engine of the compression ignition type comprising a cylindrical body having two portions of reduced diameters adjacent its top; groove means in the periphery of the reduced portions; a sleeve on the reduced portions to close the groove means to form a passageway adapted to conduct the coolant for the piston; and an annular insert in the sleeve having a piston ring groove therein.

2. A piston for an internal combustion engine of the compression ignition type comprising a cylindrical body having adjacent portions of reduced diameters adjacent its top, the diameter of the upper of said portions being less than the diameter of the lower portion; a first shoulder on the piston between said adjacent portions of reduced diameter; a second shoulder on the piston at the lower end of the lower portion of reduced diameter; groove means in the peripheries of said reduced portions; a sleeve on the reduced portions to close the groove means to form a passageway adapted to conduct a coolant for the piston, said sleeve fitting on to the portions of reduced diameter and being disposed in contiguity with the body shoulders; and an annular insert in the sleeve having at least one piston ring groove therein, said insert being disposed between the aforesaid piston ring grooves and the top of the piston.

3. A ring carrier adapted to be secured to a piston having oil cooling grooves thereon and serving to close the grooves to form a passageway to conduct a coolant for the piston comprising an upper portion, said upper portion closing at least one oil cooling groove; an annular insert in the upper portion; and a lower portion of less thickness than the upper portion, said lower portion closing at least one oil cooling groove.

References Cited in the file of this patent

UNITED STATES PATENTS

| | | |
|---|---|---|
| 2,244,008 | Hazen et al. | June 3, 1941 |
| 2,261,405 | Nicolle | Nov. 4, 1941 |
| 2,409,852 | Harrah | Mar. 19, 1945 |
| 2,550,879 | Stevens | May 1, 1951 |

FOREIGN PATENTS

| | | |
|---|---|---|
| 218,188 | Switzerland | Mar. 16, 1942 |

OTHER REFERENCES

Article on page 67, Automotive Industries, vol. 111, Issue No. 12, Dec. 15, 1954.